(12) United States Patent
Avendano Arenas et al.

(10) Patent No.: US 11,584,327 B1
(45) Date of Patent: Feb. 21, 2023

(54) TRIM ASSEMBLY FOR A VEHICLE (71) Applicant: Ford Global Technologies, LLC, Dearborn, MI (US)

(72) Inventors: Pamela Avendano Arenas, Ypsilanti, MI (US); Christopher Robert Tilli, Brighton, MI (US); Maria Fernanda Medina Luna, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 17/515,624

(22) Filed: Nov. 1, 2021

(51) Int. Cl.
*B60R 21/214* (2011.01)
*B60R 21/215* (2011.01)

(52) U.S. Cl.
CPC .......... *B60R 21/214* (2013.01); *B60R 21/215* (2013.01); *B60R 2021/21537* (2013.01)

(58) Field of Classification Search
CPC .............. B60R 2021/21537; B60R 21/214
See application file for complete search history.

(56) References Cited

U.S. PATENT DOCUMENTS

| | | | | |
|---|---|---|---|---|
| 8,641,083 | B2 * | 2/2014 | Nakamura | B60R 21/21 280/730.2 |
| 9,387,821 | B1 * | 7/2016 | Saunders | B60R 21/213 |
| 9,487,162 | B2 * | 11/2016 | Inagawa | B60R 21/213 |
| 10,377,324 | B2 * | 8/2019 | Gaudig | B60R 21/215 |
| 10,538,216 | B2 | 1/2020 | White et al. | |
| 10,723,306 | B2 * | 7/2020 | Komura | B62D 27/065 |
| 11,142,257 | B2 | 10/2021 | Hida et al. | |
| 11,370,367 | B2 * | 6/2022 | Goleniak | B60R 13/02 |
| 2014/0110922 | A1 * | 4/2014 | Uchida | B60R 21/213 280/730.2 |
| 2014/0232090 | A1 | 8/2014 | Yoshitake et al. | |
| 2015/0130174 | A1 * | 5/2015 | Gillay | B60R 21/213 280/743.2 |
| 2016/0176377 | A1 * | 6/2016 | Jenny | B60R 21/213 280/730.2 |
| 2020/0262485 | A1 | 8/2020 | Hida et al. | |
| 2021/0171113 | A1 | 6/2021 | Kim | |
| 2021/0171125 | A1 | 6/2021 | Yong et al. | |
| 2021/0213905 | A1 * | 7/2021 | Bal | B60R 13/0206 |
| 2022/0016962 | A1 * | 1/2022 | Lewis | B60J 7/1291 |
| 2022/0194312 | A1 * | 6/2022 | Tallapragada | B60R 21/215 |
| 2022/0258690 | A1 * | 8/2022 | Mar | B60R 13/0206 |
| 2022/0258691 | A1 * | 8/2022 | Tilli | B60R 21/213 |

FOREIGN PATENT DOCUMENTS

| | | | | |
|---|---|---|---|---|
| CN | 112654534 A | * | 4/2021 | ........... B60R 13/025 |
| WO | WO-2015008573 A1 | * | 1/2015 | ......... B60R 13/0206 |

* cited by examiner

*Primary Examiner* — Nicole T Verley
(74) *Attorney, Agent, or Firm* — Vichit Chea; Price Heneveld LLP (57) ABSTRACT

A bracket assembly for a vehicle frame includes a trim piece with a high retention clip. The trim piece incudes a deployable portion that is configured to partially deploy in response to a first predetermined force. An inflator tube is concealed by the trim piece and includes an air curtain. A bracket is operably coupled to the trim piece. The bracket has a deformable portion and side portions.

20 Claims, 10 Drawing Sheets

TRIM ASSEMBLY FOR A VEHICLE

FIELD OF THE DISCLOSURE

The present disclosure generally relates to a vehicle. More specifically, the present disclosure generally relates to a trim assembly for a vehicle.

BACKGROUND OF THE DISCLOSURE

Vehicles often have features for securing components in specific locations on the vehicle.

The features may also retain select spacing and configurations between multiple components.

SUMMARY OF THE DISCLOSURE

According to a first aspect of the present disclosure, a vehicle includes a vehicle frame with a rear header and a support tube. A trim piece is operably coupled to the support tube via a high retention clip. The trim piece is configured to partially deploy in response to a first predetermined force. An inflator tube is positioned between the support tube and the trim piece. The inflator tube includes an air curtain. A bracket is coupled to the trim piece. The bracket has a deformable portion that is configured to deform in response to a second predetermined force.

Embodiments of the first aspect of the disclosure can include any one or a combination of the following features:
  the bracket includes first and second side portions;
  the first side portion is proximate a lower surface of the rear header;
  the second side portion is proximate the support tube;
  a space is defined between the first side portion of the bracket and the lower surface of the rear header and is also defined between the second side portion of the bracket and the support tube;
  the first side portion of the bracket is engaged with the lower surface of the rear header and the second side portion of the bracket is engaged with the support tube in response to the second predetermined force;
  the trim piece includes retention features;
  the bracket defines apertures through which the retention features extend;
  the trim piece has a first end and a second end;
  the trim piece defines a living hinge on the first end and a high retention clip is positioned proximate the second end; and/or
  the living hinge is configured to bias in response to the first predetermined force.

According to a second aspect of the present disclosure, a trim assembly for a vehicle frame includes a trim piece with a high retention clip. The trim piece incudes a deployable portion that is configured to partially deploy in response to a first predetermined force. An inflator tube is concealed by the trim piece and includes an air curtain. A bracket is operably coupled to the trim piece. The bracket has a deformable portion and side portions.

Embodiments of the second aspect of the disclosure can include any one or a combination of the following features:
  the deformable portion of the bracket is configured to deform in response to a second predetermined force;
  the side portions of the bracket mutually engage the vehicle frame in response to the second predetermined force;
  a support tube is proximate the inflator tube;
  the trim piece is coupled to the support tube via the high retention clip;
  the trim piece includes a living hinge that is configured to bias the deployable portion of the trim piece in response to the first predetermined force;
  the trim piece includes a locator rib that is defined along an edge of the trim piece;
  the bracket defines apertures and the trim piece includes retention features; and/or
  the retention features of the trim piece extend through the apertures to couple the bracket to the trim piece.

According to a third aspect of the present disclosure, a vehicle frame includes a support tube. A rear header is operably coupled to the support tube and has a lower surface. A trim piece is operably coupled to the support tube. The trim piece has a living hinge and includes a high retention clip. An inflator tube is positioned between the trim piece and the support tube. A deformable bracket is operably coupled to the trim piece and is proximate to the support tube and the rear header. The deformable bracket is operably coupled to the trim piece and is proximate to the support tube and the rear header. The deformable bracket is defining a space between each of the support tube and the rear header.

Embodiments of the third aspect of the disclosure can include any one or a combination of the following features:
  the trim piece is configured to deploy in response to a first predetermined force;
  the deformable bracket is configured to deform in response to a second predetermined force;
  the inflator tube includes an inflator that is configured to deploy an air curtain in response to a third predetermined force;
  the bracket includes side portions;
  the side portions mutually engage the lower surface of the rear header and the support tube in response to the second predetermined force;
  the trim piece includes a deployable portion that is defined by the living hinge;
  the deployable portion is biased via the living hinge in response to the first predetermined force;
  the trim piece includes a fixed portion; and/or
  the high retention clip fixedly couples the fixed portion to the support tube and is configured to retain the fixed portion relative the support tube in response to the first predetermined force.

These and other aspects, objects, and features of the present invention will be understood and appreciated by those skilled in the art upon studying the following specification, claims, and appended drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
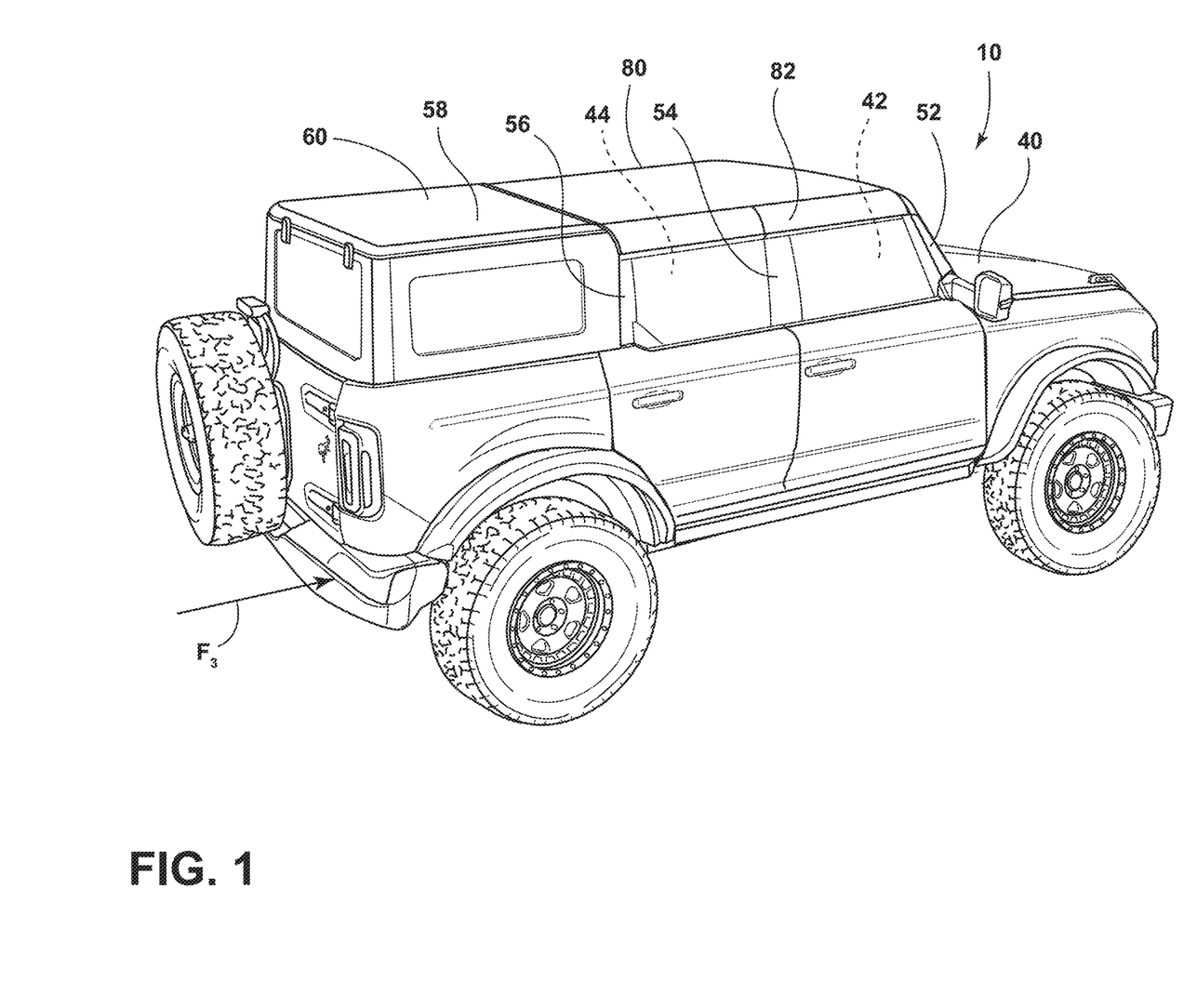
FIG. 1 is a top perspective view of a vehicle of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference number 10 generally refers to a vehicle that includes a vehicle frame 12 with a rear header 14 and a support tube 16. A trim piece 18 is operably coupled to the support tube 16 via a high retention clip 20. The trim piece 18 includes a deployable portion 22 that is configured to deploy in response to a first predetermined force $F_1$. An inflator tube 24 is positioned between the support tube 16 and the trim piece 18. The inflator tube 24 includes an air curtain 26. A bracket 28 is coupled to the trim piece 18 and has a deformable portion 30 configured to deform in response to a second predetermined force $F_2$.

Referring now to FIGS. 1-4, the vehicle 10 has a vehicle body 40 that includes the vehicle frame 12. The vehicle frame 12 defines an interior 42 of the vehicle 10, which includes a passenger compartment 44 therein. The passenger compartment 44 may include a first seating row 46 and a second seating row 48. Fewer or more seating rows may be included in the vehicle 10 without departing from the teachings herein. The vehicle body 40 includes vertical supports, generally referred to as pillars 50. In the illustrated example, the pillars 50 include an A-pillar 52, a B-pillar 54, and a C-pillar 56. The first seating row 46 is generally disposed between the A-pillar 52 and the B-pillar 54, while the second seating row 48 is generally disposed between the B-pillar 54 and the C-pillar 56. Additional or fewer pillars 50 may be included in the vehicle 10 without departing from the teachings herein.

In various examples, the vehicle 10 may be a motor vehicle, such as a land vehicle, an air vehicle, or a watercraft. The vehicle 10 may be driver-based, semi-autonomous, or fully-autonomous. For example, in semi-autonomous examples, the vehicle 10 may monitor and execute routine traffic maneuvers (e.g., braking, accelerating, lane changes, turning, parking, engaging turn signals, etc.) while a user maintains override control. In various examples, the vehicle 10 is a wheeled motor vehicle 10, which may be a sedan, a sport utility vehicle, a truck, a van, a crossover, and/or other styles of vehicle. As illustrated in FIG. 1, the vehicle 10 is a sport utility vehicle. Additionally, the vehicle 10 may be utilized for personal and/or commercial purposes, such as ride-providing services (e.g., chauffeuring) and/or ride-sharing services.

With further reference to FIGS. 1-4, the interior 42 of the vehicle 10 may be further defined by an overhead portion 58.

The overhead portion 58 may be formed from a selectively removable shell 60 that is securely yet removably coupled to the vehicle body 40. The removable shell 60 may be removed from the vehicle body 40 to provide an open air cabin of the vehicle 10. In this configuration illustrated in FIG. 2, overhead supports 62 and the support tube 16 are externally exposed. The overhead supports 62 and the support tube 16 can be joined at one of the pillars 50 of the vehicle 10. While a single area of the vehicle 10 is described herein, it is generally contemplated that the features and configurations described apply throughout the vehicle 10.

Figure 2:
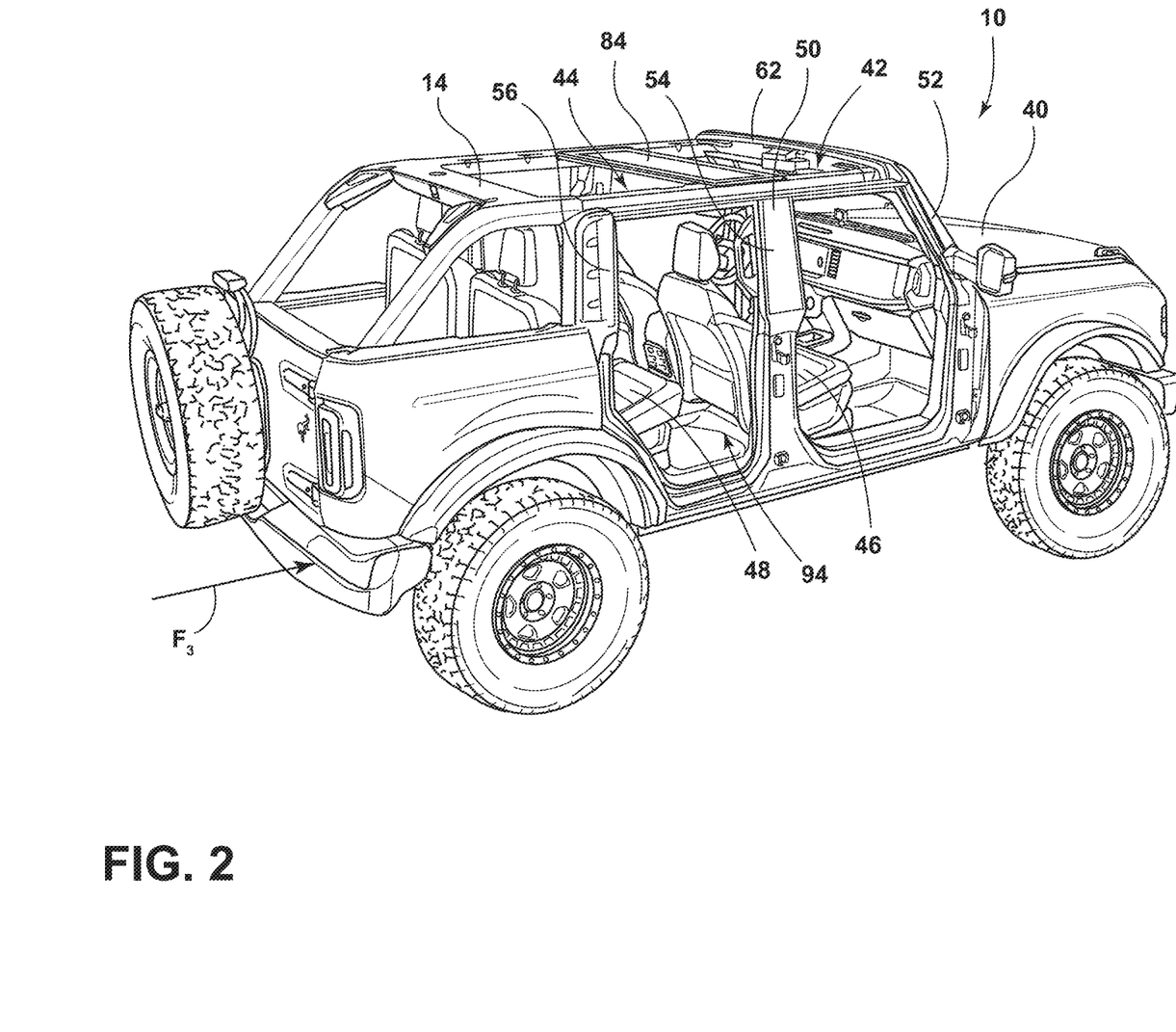
FIG. 2 is a top perspective view of the vehicle of FIG. 1 with an open air cabin.
Figure 3:
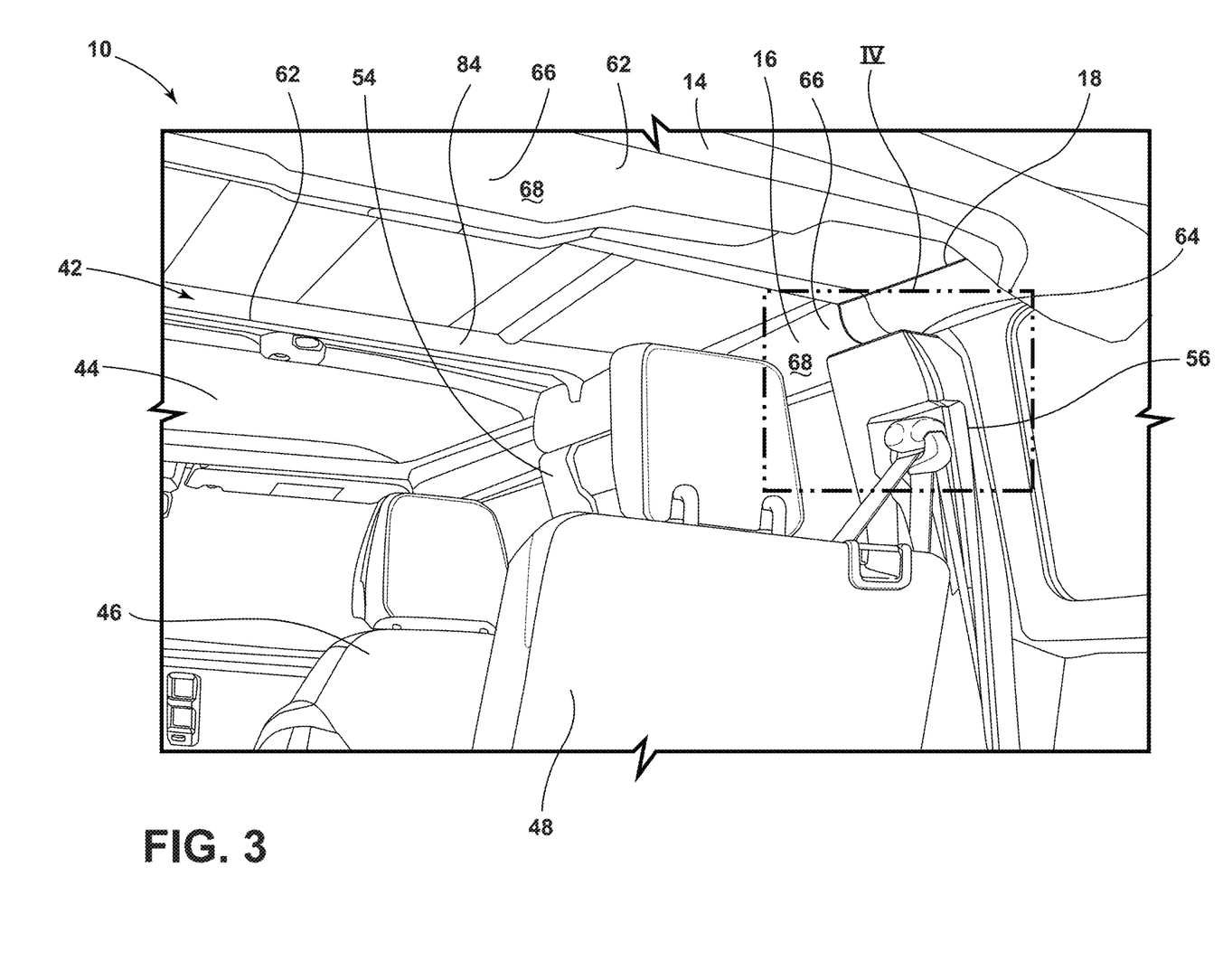
FIG. 3 is a partial side perspective view of an interior of a vehicle of the present disclosure.

As illustrated in FIG. 2, the pillars 50 may be positioned proximate the support tube 16 and/or may be coupled to the support tube 16. By way of example, not limitation, the C-pillar 56 may be positioned within a cutout 64 defined by each of the support tube 16 and the trim piece 18. The pillars 50 and the support tube 16 may each be covered in a trim 66 that aesthetically defines the passenger compartment 44 of the vehicle 10. It is generally contemplated that an outer surface 68 of each of the trim 66 and the trim piece 18 may be formed from the same material to define a uniform surface along the overhead portion 58 of the vehicle 10. By way of example, not limitation, the outer surface 68 of the trim 66 and the trim piece 18 may be formed from a fabric material that may be configured to be generally water resistant. Additionally or alternatively, the outer surface 68 of the trim 66 and the trim piece 18 may be formed from a plastic, resin, and/or any other polymeric material generally practicable for use within the passenger compartment 44.

Figure 4:
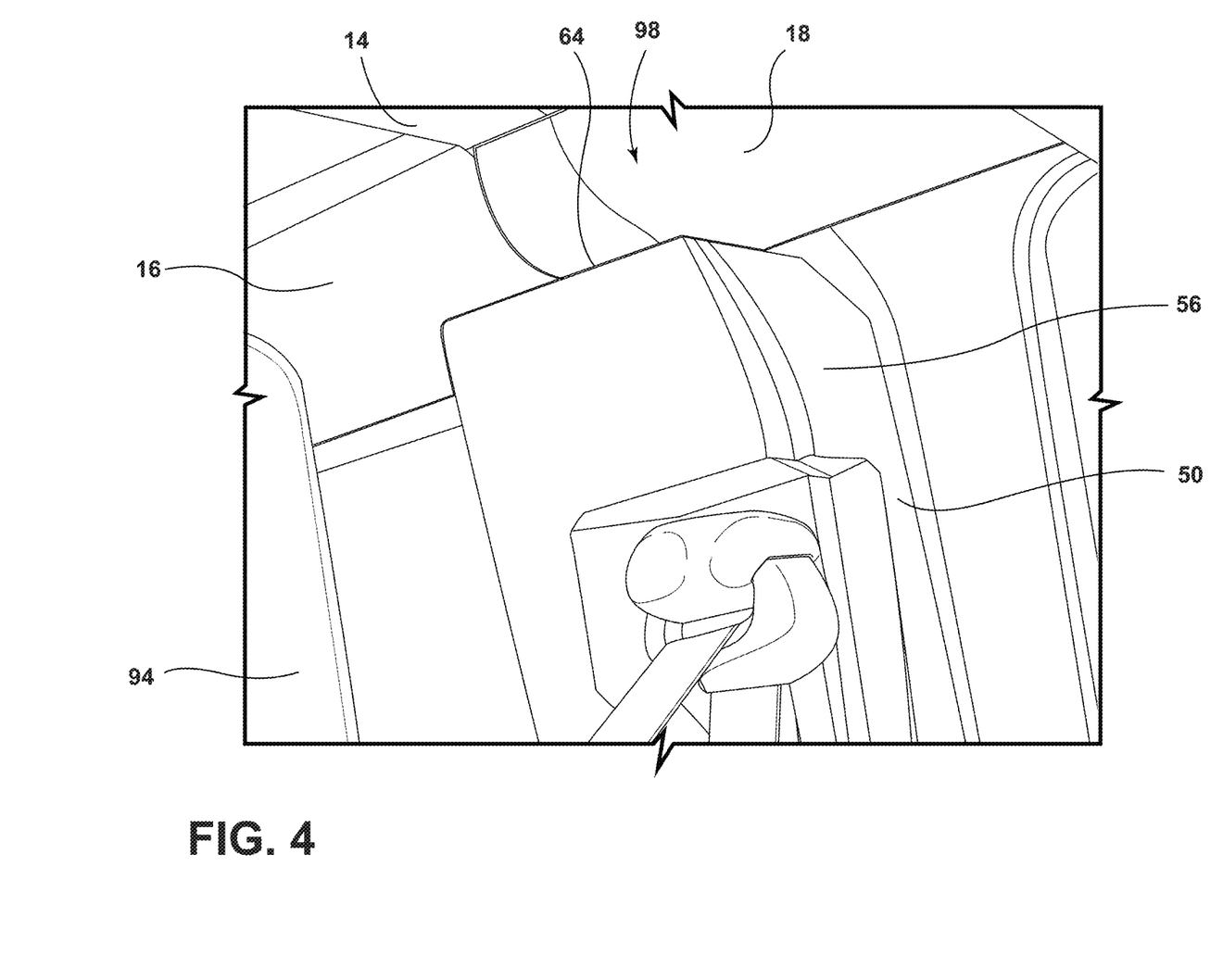
FIG. 4 is an enlarged partial side perspective view of a side of the interior of the vehicle of FIG. 3 taken at area IV in FIG. 3.
Figure 5:
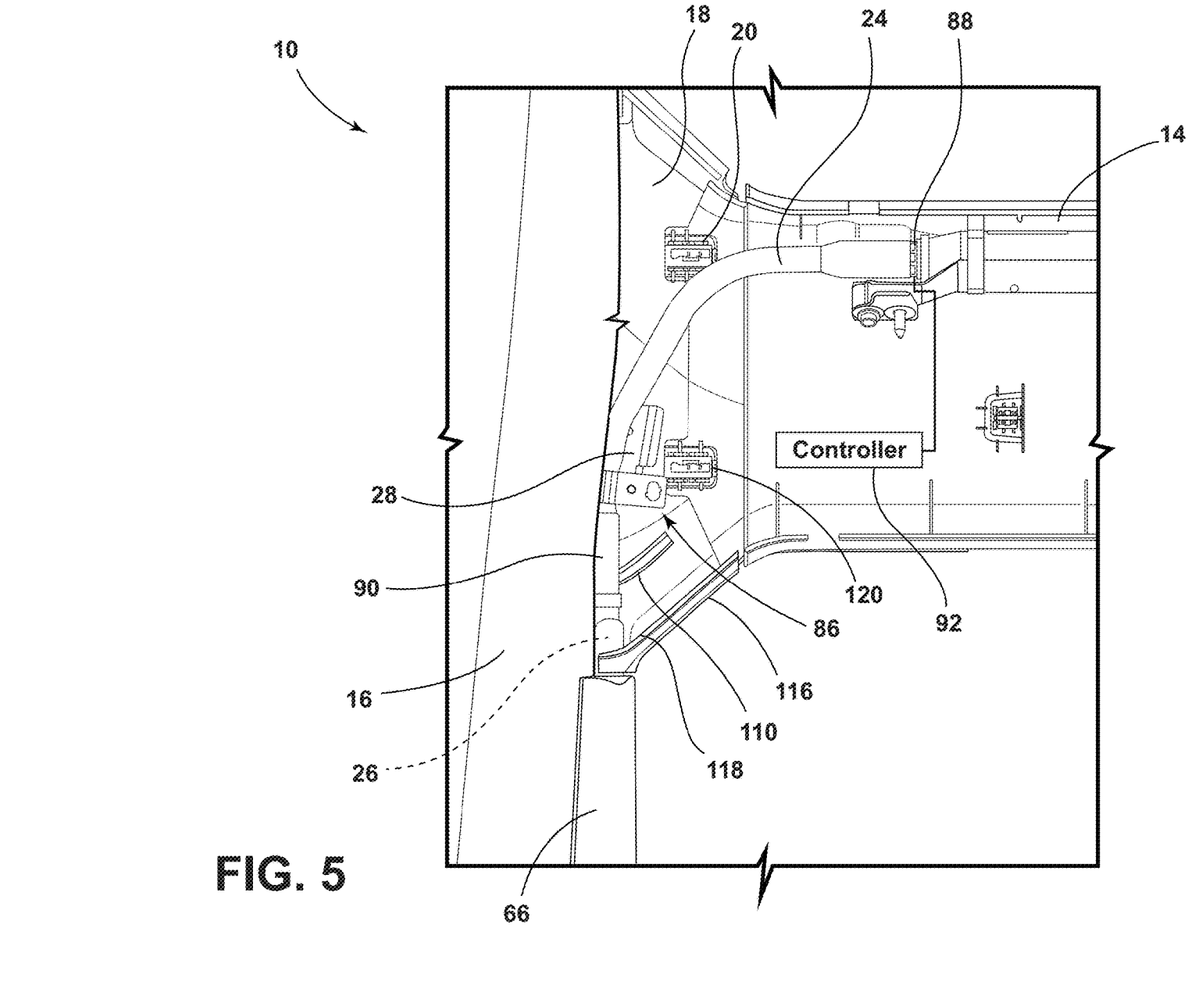
FIG. 5 is an enlarged partial top perspective view of a trim assembly and a rear header of the present disclosure.
Figure 6:
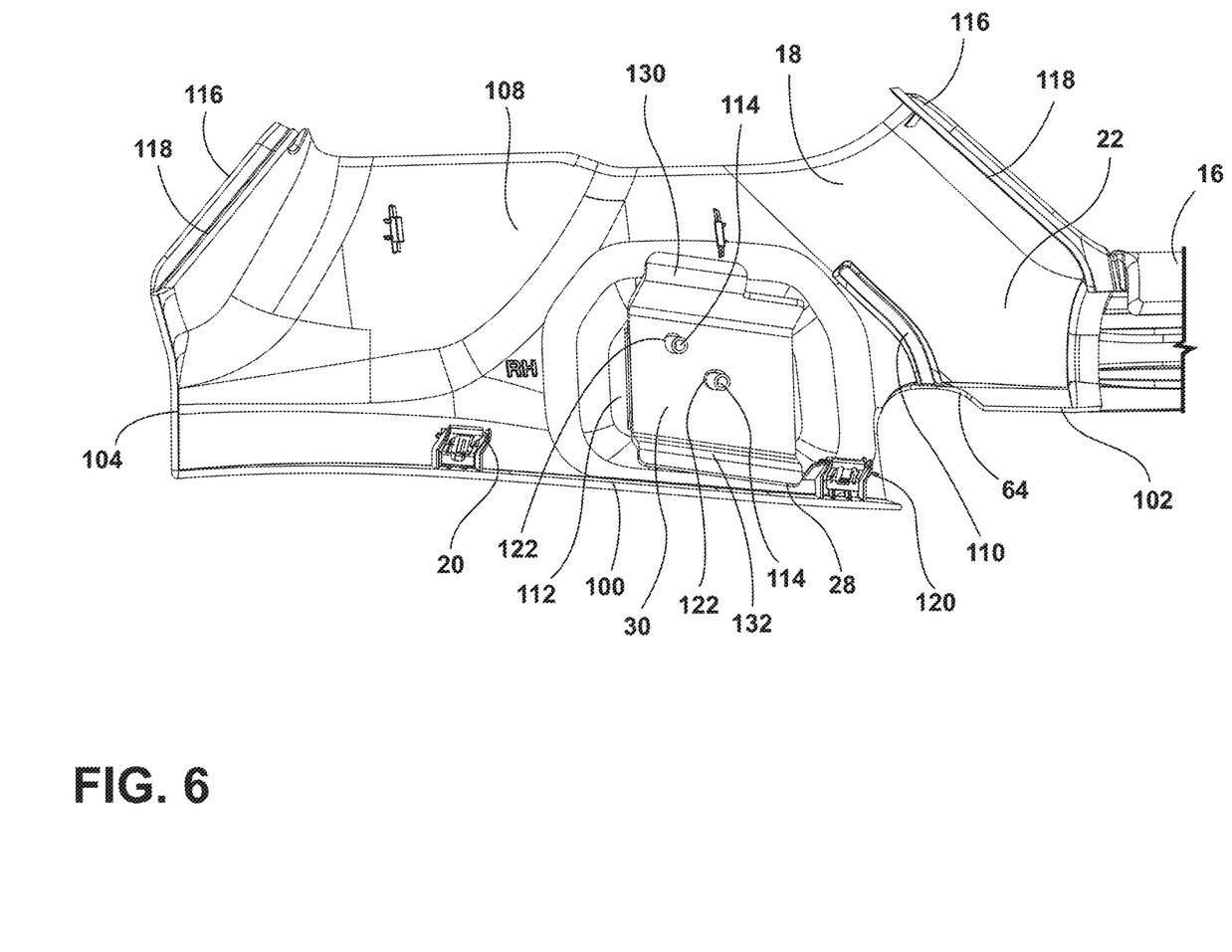
FIG. 6 is a side perspective view of a trim piece and a bracket of a trim assembly of the present disclosure.

With reference now to FIGS. 4-6, the trim piece 18 is illustrated as being coupled to the support tube 16, and proximate to the C-pillar 56 and one of the overhead supports 62, which includes the rear header 14. The overhead supports 62 extend between a first side 80 and a second side 82 of the vehicle body 40. The overhead supports 62 include a forward header 84 and the rear header 14, such that the forward header 84 is positioned vehicle forward and the rear header 14 is positioned vehicle rearward. It is generally contemplated that the overhead supports 62 are positioned proximate the overhead portion 58, and it is contemplated that the rear header 14 at least partially contains the inflator tube 24, as illustrated in FIG. 5.

The inflator tube 24 may be configured as part of an air curtain assembly 86 that is at least partially concealed by the trim piece 18 and the rear header 14. The air curtain assembly 86 includes a sensor 88 that is configured to sense a third predetermined force $F_3$ (FIG. 2), described below. The air curtain assembly 86 also includes an inflator 90 configured to deploy the air curtain 26 from the inflator tube 24 in response to the detected third predetermined force $F_3$. The inflator 90 is communicatively coupled to a controller 92, such that the controller 92 is configured to activate the inflator 90 when the sensor 88 detects the third predetermined force $F_3$. It is generally contemplated that the air curtain 26 is disposed within the inflator tube 24 and is deployed by the inflator 90. The inflator 90 and the air curtain 26 are generally in fluid communication with one another. When the inflator 90 is activated, the air curtain 26 may be deployed by the inflator 90. The air curtain 26 extends in a fore-aft direction, extending adjacent to the vehicle body 40 over a door space 94.

Referring still to FIGS. 4-6, a trim assembly 98 includes the support tube 16, the trim piece 18 and the bracket 28. The trim piece 18 is illustrated as a single panel having a body 100 with a first end 102 and a second end 104. The trim piece 18 includes the deployable portion 22 and a fixed portion 108. The first end 102 of the trim piece 18 generally corresponds to the deployable portion 22, and the second end 104 can correspond to the fixed portion 108. Additionally or alternatively, the first end 102 may correspond to the fixed portion 108, and the second end 104 may correspond to the deployable portion 22. A living hinge 110 may define the deployable portion 22 of the trim piece 18, such that the trim piece 18 may partially deploy at the living hinge 110. The trim piece 18 also includes a receiving portion 112 generally defined between the deployable portion 22 and the fixed portion 108. The receiving portion 112 includes retention features 114 configured to couple the bracket 28 to the trim piece 18. It is also contemplated that an edge 116 of the trim piece 18 may include a locator rib 118 configured to assist in alignment of the trim piece 18 relative to the support tube 16.

Figure 10:
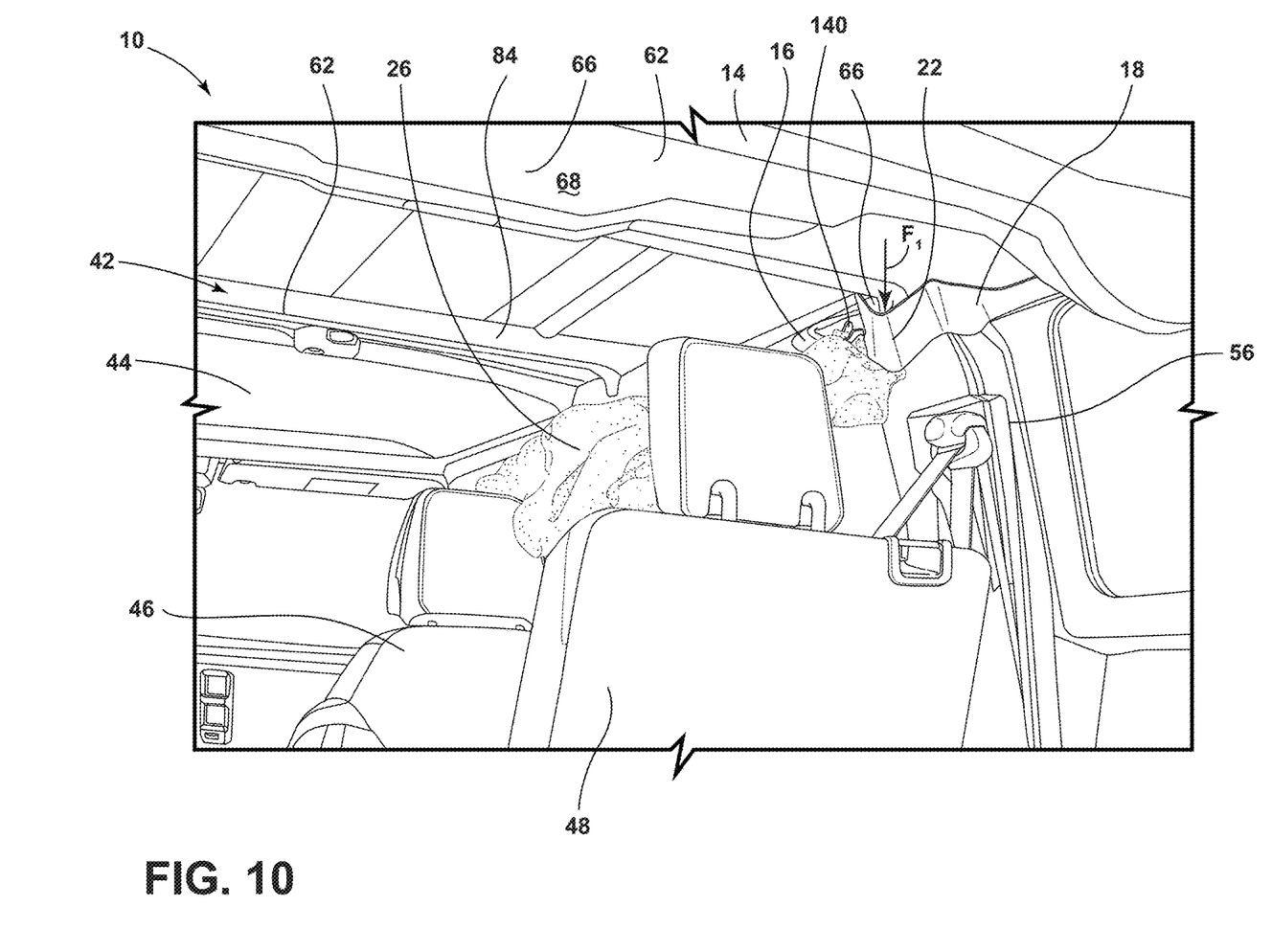
FIG. 10 is a partial side perspective view of an interior of a vehicle of the present disclosure with an air curtain partially deployed and a trim piece of the present disclosure in a partial deployed condition.

It is generally contemplated that the second end 104 of the trim piece 18 is fixed relative to the support tube 16 via the high retention clip 20. The high retention clip 20 extends through the support tube 16 and engages the support tube 16 to retain the trim piece 18 upon deployment of the air curtain 26. The deployable portion 22 of the trim piece 18 is coupled to the support tube 16 via a clip 120, which is configured to detach in response to the first predetermined force $F_1$ (FIG. 10). It is generally contemplated that the first predetermined force $F_1$ may be referred to as a predetermined deployed force $F_1$ in which the air curtain 26 applies the deployed force $F_1$ to the deployable portion 22 to uncouple the deployable portion 22 from the support tube 16.

The deployable portion 22 is configured to flex and generally uncouple from the support tube 16 once the inflator 90 is activated in response to the third predetermined force $F_3$ (FIG. 2). While the deployable portion 22 is configured to flex and bend at the living hinge 110, the fixed portion 108 of the trim piece 18 remains securely attached to the support tube 16. The living hinge 110 further assists in the overall flexibility of the trim piece 18 while cooperating with the fixed portion 108 to maintain the continuous structure of the body 100 of the trim piece 18. Stated differently, the deployable portion 22 may be deployed or otherwise detached from the support tube 16 while the fixed portion 108 of the trim piece 18 remains securely coupled to the support tube 16 via the high retention clip 20. The high retention clip 20 fixedly couples the fixed portion 108 to the support tube 16 and is configured to retain the fixed portion relative the support tube 16 in response to the first predetermined force $F_1$ (FIG. 10).

Figure 7:
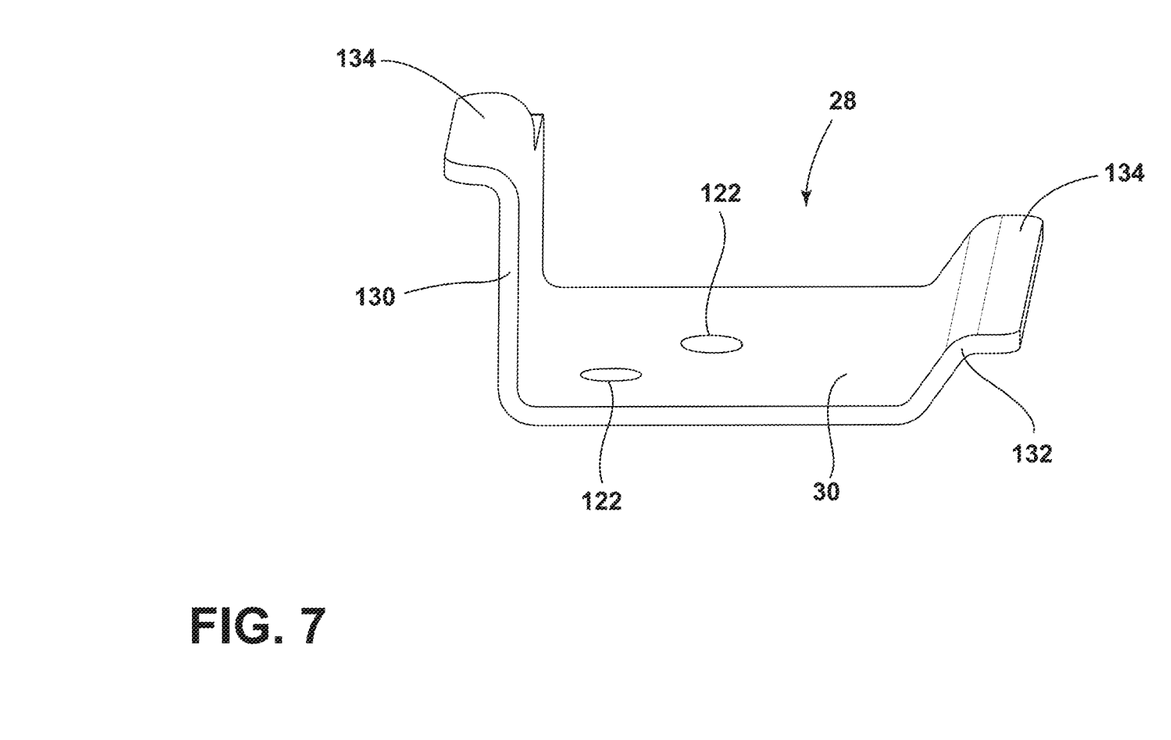
FIG. 7 is a side perspective view of a bracket of the present disclosure.
Figure 8:
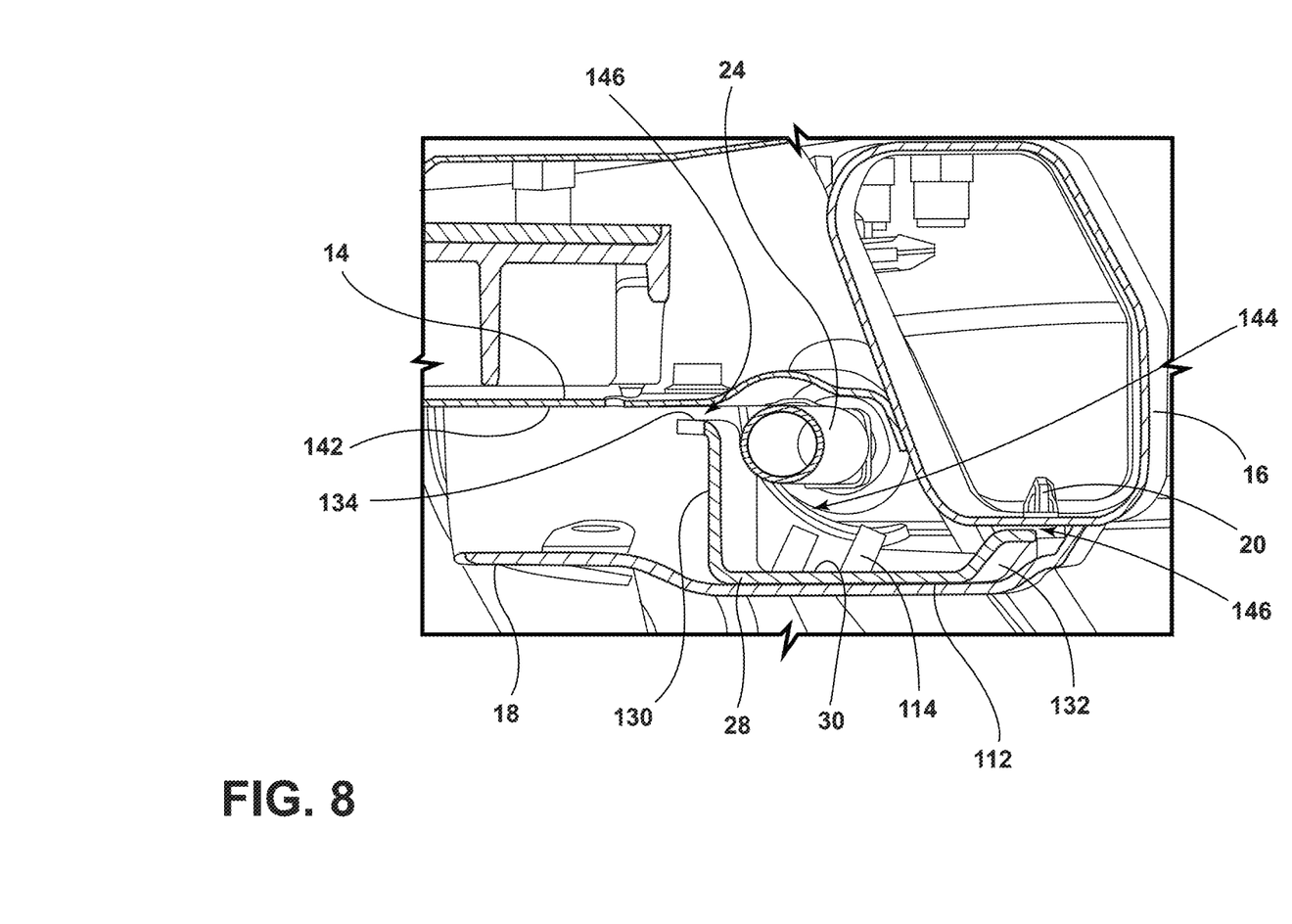
FIG. 8 is a partial side cross-sectional view of a trim assembly of the present disclosure.
Figure 9:
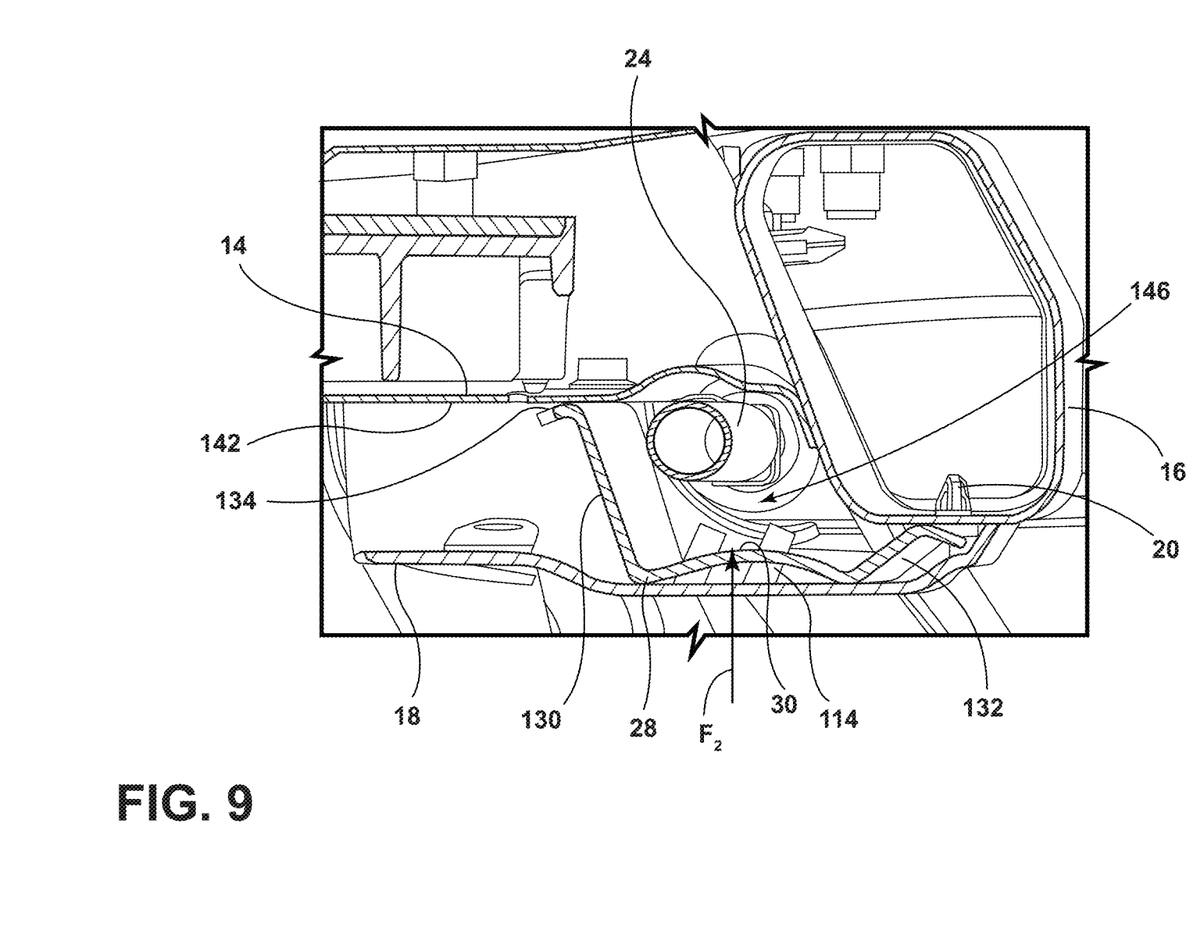
FIG. 9 is a partial side cross-section view of the trim assembly of FIG. 8 with a deformable portion of a bracket in a deformed condition.

Referring now to FIGS. 5-8, the receiving portion 112 of the trim piece 18 is configured to receive the bracket 28. The receiving portion 112 includes the retention features 114 that couple the bracket 28 to the trim piece 18. The bracket 28 defines apertures 122 through which the retention features 114 extend. As illustrated in FIG. 6, the retention features 114 are depicted as cylindrical posts that extend from the receiving portion 112 of the trim piece 18. The bracket 28 may be positioned over the retention features 114, such that the apertures 122 surround the retention features 114 to couple the bracket 28 to the trim piece 18. As discussed below, the bracket 28 may translate away from the trim piece 18 along the retention features 114 in response to the second predetermined force $F_2$ (FIG. 9).

The bracket 28 includes first and second side portions 130, 132 that extend from the deformable portion 30. Each of the first and second side portions 130, 132 have an engagement surface 134 configured to brace the bracket 28 in response to the second predetermined force $F_2$. The first side portion 130 of the bracket 28 is positioned beneath the rear header 14, and the second side portion 132 of the bracket 28 is positioned beneath the support tube 16. The first side portion 130 is generally perpendicular relative to the deformable portion 30, such that the first side portion 130 is configured as a rigid brace. The second side portion 132 is illustrated as having an angled configuration relative to the deformable portion 30, such that there may be more give between the second side portion 132 and the deformable portion 30 in response to the second predetermined force $F_2$.

With further reference to FIGS. 5-9, it is also contemplated that the inflator tube 24 extends between the rear header 14 and the bracket 28. The deformable portion 30 of the bracket 28 may be generally parallel or otherwise aligned with the inflator tube 24. Additionally or alternatively, the inflator tube 24 and the deformable portion 30 of the bracket 28 may be offset relative one another and/or positioned in any other configuration. The geometry of the bracket 28 avoids contact between the deformable portion 30 and the inflator tube 24 when the deformable portion 30 deforms in response to the second predetermined force $F_2$. The rigid engagement between the first and second side portions 130, 132 and the rear header 14 and support tube 16, respectively, brace the bracket 28 to prevent contact with the inflator tube 24.

The deformable portion 30 is configured to bend or otherwise deform in response to the second predetermined force $F_2$. It is generally contemplated that the second predetermined force $F_2$ may coincide and/or be simultaneous with the first and/or third predetermined forces $F_1$, $F_3$ (FIGS. 10 and 2). The air curtain 26 may be deployed by the inflator 90 in response to the third predetermined force $F_3$, while the deformable portion 30 of the bracket 28 is deformed in response to the second predetermined force $F_2$. As the air curtain 26 is deployed, the deployable portion 22 of the trim piece 18 is uncoupled from the support tube 16 in response to the first predetermined force $F_1$.

With reference now to FIGS. 2 and 8-10 and as mentioned above, the sensor 88 detects the third predetermined force $F_3$ and communicates the detected force $F_3$ with the controller 92. It is generally contemplated that the third predetermined force $F_3$ is applied to the vehicle body 40 and detected by the sensor 88. The controller 92 activates the inflator 90 to deploy the air curtain 26. The inflator 90 translates a fluid, typically gas, through the air curtain 26 to inflate and deploy the air curtain 26 within the door space 94 (FIG. 2). The air curtain 26 is released from the inflator tube 24 and generally expands during inflation by the inflator 90. The expansion of the air curtain 26 may result in the air curtain 26 pressing or otherwise engaging with the trim piece 18 to define the first predetermined force $F_1$. The trim piece 18 can then partially deploy in response to the first predetermined force $F_1$ while also remaining partially fixed to the support tube 16 via the high retention clip 20.

The trim piece 18 may be partially uncoupled from the support tube 16, such that the deployable portion 22 of the trim piece 18 may be adjusted, and the air curtain 26 may extend through an opening 140 defined when the deployable portion 22 of the trim piece 18 is uncoupled from the support tube 16. As the air curtain 26 is deployed by the inflator 90, the first predetermined force $F_1$ is applied on the deployable portion 22 so the trim piece 18 is articulated and generally bends at the living hinge 110. The living hinge 110 assists in the flexion of the deployable portion 22, while the fixed portion 108 remains coupled to the support tube 16. The flexion of the deployable portion 22 at the living hinge 110 allows the air curtain 26 to be deployed through the opening 140 defined by the deployable portion 22 of the trim piece 18, while the rest of the body 100 of the trim piece 18 remains fixedly coupled to the support tube 16.

Referring still to FIGS. 2 and 8-10, the first and second side portions 130, 132 of the bracket 28 engage with the support tube 16 and the rear header 14 in response to the second predetermined force $F_2$. The second predetermined force $F_2$ may act upon the deformable portion 30 of the bracket 28 to translate the deformable portion 30 away from the receiving portion 112 of the trim piece 18. The deformable portion 30 may translate along the retention features 114 of the trim piece 18, while the apertures 122 may remain disposed around the retention features 114. The first and second side portion 130, 132 are configured to brace the bracket 28 in response to the second predetermined force $F_2$ to generally maintain the position of the bracket 28 relative to the trim piece 18.

The engagement surface 134 of the first side portion 130 engages a lower surface 142 of the rear header 14, and the engagement surface 134 of the second side portion 132 engages the support tube 16. The geometry of the bracket 28, in particular the first and second side portions 130, 132, assists in the ability of the bracket 28 to deform without engaging or otherwise contacting the inflator tube 24. Rather, a gap 144 is maintained between the deformable portion 30 and the inflator tube 24 even after application of the second predetermined force $F_2$. Prior to application of the second predetermined force $F_2$, a space 146 is defined between the engagement surfaces 134 of each of the first and second side portions 130, 132 and the rear header 14 and support tube 16, respectively.

Referring still to FIGS. 2 and 8-10, the space 146 assists in providing room in which the bracket 28 can translate in response to the predetermined force $F_2$, while maintaining the gap 144 between the bracket 28 and the inflator tube 24. The retention features 114 of the trim piece 18 further assist in properly aligning the bracket 28 in the receiving portion 112 of the trim piece 18. The proper alignment ensures the first and second side portions 130, 132 of the bracket 28 are aligned with the rear header 14 and the support tube 16, respectively, despite the space 146 and general movement of the vehicle 10 (FIG. 1). The first and second side portions 130, 132 of the bracket 28 are translated toward the rear header 14 and the support tube 16, respectively, in response to the second predetermined force $F_2$.

The first and second side portions 130, 132 brace against the lower surface 142 of the rear header 14 and the support tube 16, respectively, to maintain the gap 144 between the deformable portion 30 and the inflator tube 24. Stated differently, the bracket 28 is free from contact with the inflator tube 24 even when the deformable portion 30 deforms in response to the second predetermined force $F_2$. The first and second side portions 130, 132 of the bracket 28 are contemplated to be formed of a rigid material configured to resist bending or other deformation. The deformable portion 30 may be made from a generally similar material but is instead configured to be more malleable in order to deform in response to the predetermined force $F_2$.

Referring again to FIGS. 1-10, the bracket 28 and the trim piece 18 cooperate to respond to the first and second predetermined forces $F_1$, $F_2$ to assist in the deployment of the air curtain 26. The deformable portion 30 of the bracket 28 is configured to deform while simultaneously preventing contact with the inflator tube 24. Further, the high retention clip 20 of the trim piece 18 fixedly retains the trim piece 18 to the support tube 16 even during deployment of the air curtain 26. While the fixed portion 108 of the trim piece 18 remains fixed to the support tube 16, the deployable portion 22 can bias at the living hinge 110 to define the opening 140 through which the air curtain 26 can deploy.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
a vehicle frame including a rear header and a support tube;
a trim piece operably coupled to the support tube via a high retention clip, wherein the trim piece is configured to partially deploy in response to a first predetermined force;
an inflator tube positioned between the support tube and the deployable trim piece, the inflator tube including an air curtain; and
a bracket coupled to the trim piece, the bracket having a deformable portion configured to deform in response to a second predetermined force.

2. The vehicle of claim 1, wherein the bracket includes first and second side portions, and wherein the first side portion is proximate a lower surface of the rear header, and further wherein the second side portion is proximate the support tube.

3. The vehicle of claim 2, wherein a space is defined between the first side portion of the bracket and the lower surface of the rear header and is also defined between the second side portion of the bracket and the support tube.

4. The vehicle of claim 2, wherein the first side portion of the bracket is engaged with the lower surface of the rear header and the second side portion of the bracket is engaged with the support tube in response to the second predetermined force.

5. The vehicle of claim 1, wherein the trim piece includes retention features, and wherein the bracket defines apertures through which the retention features extend.

6. The vehicle of claim 1, wherein the trim piece has a first end and a second end, and wherein the trim piece defines a living hinge on the first end and the high retention clip is positioned proximate the second end.

7. The vehicle of claim 6, wherein the living hinge is configured to bias in response to the first predetermined force.

8. A trim assembly for a vehicle frame, comprising:
a trim piece including a high retention clip, wherein the trim piece includes a deployable portion that is configured to partially deploy in response to a first predetermined force;
an inflator tube concealed by the trim piece and including an air curtain; and
a bracket operably coupled to the trim piece, the bracket having a deformable portion and side portions.

9. The trim assembly of claim 8, wherein the deformable portion of the bracket is configured to deform in response to a second predetermined force.

10. The trim assembly of claim 9, wherein the side portions of the bracket mutually engage said vehicle frame in response to the second predetermined force.

11. The trim assembly of claim 8, further comprising:
a support tube proximate the inflator tube, wherein the trim piece is coupled to the support tube via the high retention clip.

12. The trim assembly of claim 8, wherein the trim piece includes a living hinge configured to bias the deployable portion of the trim piece in response to the first predetermined force.

13. The trim assembly of claim 8, wherein the trim piece includes a locator rib defined along an edge of the trim piece.

14. The trim assembly of claim 13, wherein the bracket defines apertures and the trim piece includes retention features, and wherein the retention features of the trim piece extend through the apertures to couple the bracket to the trim piece.

15. A vehicle frame, comprising:
a support tube;
a rear header operably coupled to the support tube and having a lower surface;
a trim piece operably coupled to the support tube, the trim piece having a living hinge and including a high retention clip;
an inflator tube positioned between the trim piece and the support tube; and
a deformable bracket operably coupled to the trim piece and proximate to the support tube and the rear header, the deformable bracket defining a space between each of the support tube and the rear header.

16. The vehicle frame of claim 15, wherein the trim piece is configured to deploy in response to a first predetermined force, and wherein the deformable bracket is configured to deform in response to a second predetermined force.

17. The vehicle frame of claim 16, wherein the inflator tube includes an inflator that is configured to deploy an air curtain in response to a third predetermined force.

18. The vehicle frame of claim 16, wherein the bracket includes side portions, and wherein the side portions mutually engage the lower surface of the rear header and the support tube in response to the second predetermined force.

19. The vehicle frame of claim 16, wherein the trim piece includes a deployable portion defined by the living hinge, and wherein the deployable portion is biased via the living hinge in response to the first predetermined force.

20. The vehicle frame of claim 16, wherein the trim piece includes a fixed portion, and wherein the high retention clip fixedly couples the fixed portion to the support tube and is configured to retain the fixed portion relative the support tube in response to the first predetermined force.

\* \* \* \* \*